No. 610,021. Patented Aug. 30, 1898.
C. V. BOGART.
CENTERING GAGE.
(Application filed Dec. 15, 1897.)
(No Model.)

WITNESSES:
A. D. Harrison.
P. W. Pizzetti

INVENTOR
Chas. V. Bogart
by Wright, Brown & Quinby
Attys

UNITED STATES PATENT OFFICE.

CHARLES V. BOGART, OF FITCHBURG, MASSACHUSETTS.

CENTERING-GAGE.

SPECIFICATION forming part of Letters Patent No. 610,021, dated August 30, 1898.

Application filed December 15, 1897. Serial No. 661,971. (No model.)

*To all whom it may concern:*

Be it known that I, CHARLES V. BOGART, of Fitchburg, in the county of Worcester and State of Massachusetts, have invented certain new and useful Improvements in Centering-Gages, of which the following is a specification.

This invention has for its object to provide a gage for centering a body within an inclosure having cylindrical walls—as, for instance, an engine-piston within its cylinder.

The invention consists in certain novel features of construction and arrangement forming the subject of the succeeding description and claims.

Figure 1:
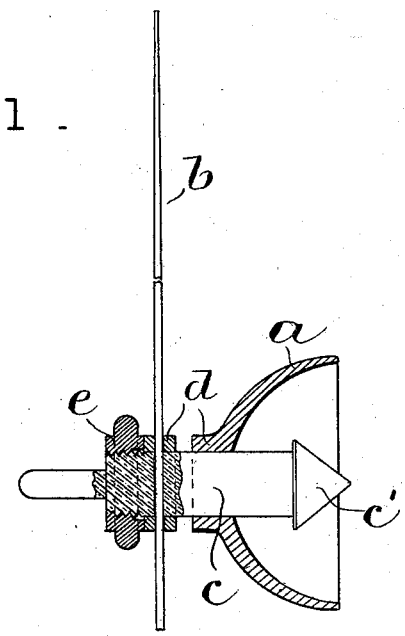
Figure 2:
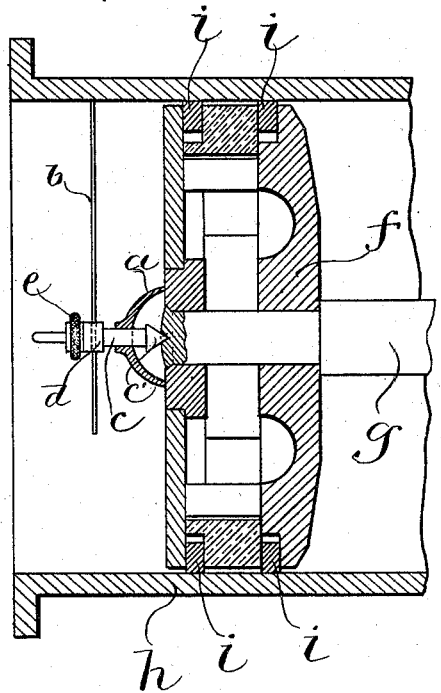

Of the accompanying drawings, which form a part of this application, Figure 1 represents a view, partly in section and partly in elevation, showing a centering-gage constructed in accordance with my invention. Fig. 2 represents a sectional view illustrating the manner of applying my improved device to the centering of an engine-piston.

The same reference characters indicate the same parts in both figures.

In the drawings, $a$ represents a cup-shaped collar forming a base and guide adapted to be placed against the face of an engine-piston $f$, and $c$ is a cylindrical spindle fitting loosely in the collar $a$, so as to rotate and slide therein, and having on its front end a conical center $c'$, whose point enters the small conical depression or hole in the end of the piston-rod $g$ when the gage is positioned.

$b$ is an adjustable arm occupying a transverse aperture in the spindle $c$ and held in place by a ring $d$, having apertures which register with the aperture in the spindle and a locking thumb-nut which abuts the collar and engages screw-threads on the rear end of the spindle. The arm $b$ may be fixed at various adjustments by loosening the nut $e$, moving the arm until the desired length projects on one side of the spindle, and then retightening the nut.

To operate the device in centering a piston, the center $c'$ is placed in the depression at the end of the piston-rod $g$, and the base or guide $a$, which may instead of being cupped be formed with three or more legs, is placed against the face of the piston, as shown in Fig. 2, or against a boss on the piston, or against a nut on the end of the piston-rod, as the case may be, and by means of said guide the spindle $c$ is easily kept in alinement with the axis of the piston, the arm $b$ being at right angles thereto. Then when the arm $b$ has been adjusted to a radius approximately equal to the internal radius of the cylinder $h$ the spindle is turned in its socket and the arm is swept around to determine the position of the piston-rod $g$. If said rod is found to be eccentric to the cylinder, the packing-rings $i$ $i$ on the periphery of the piston are set out in such a manner as to bring the rod $g$ nearer the center and a test is again made with the gage, the operation being repeated until the piston is properly centered. The parts of the gage are all preferably made of metal, and the base $a$, being rigid and adapted to be placed against some part of the piston whose surface is normal to the axis of the cylinder, serves to maintain the axis of revolution of the arm and spindle strictly parallel to said cylinder-axis.

Having thus explained the nature of my invention and described a way of constructing and using the same, although without having attempted to set forth all the forms in which it may be embodied or all the modes of its use, I declare that what I claim is—

1. A gage for centering a body within a cylinder, comprising a rigid guiding-base adapted to be placed against a surface of said body normal to the cylinder-axis, a center projecting forwardly from said base and having provisions for a normally free axial movement with respect thereto, and an arm or sweep pivotally mounted on said base, the construction and arrangement being such that the rigid base, positioned against the normal surface of the body serves to maintain the axis of rotation of the arm or sweep parallel to the cylinder-axis.

2. A gage for centering a body within a cylinder, comprising a rigid guiding-base adapted to be placed against a surface of said body normal to the cylinder-axis, a spindle mounted in said base and having a center at its front end, said spindle being capable of a normally free axial and rotative movement in said base, and an arm or sweep adjustably secured to said spindle and projecting laterally therefrom, the construction and arrangement being such that the rigid base, positioned against the normal surface of the body, serves to maintain the axis of rotation of the spindle and arm parallel to the cylinder-axis.

3. A gage for centering a body within a cylinder, comprising a rigid guiding-base adapted to be placed against a surface of the body normal to the cylinder-axis, a spindle mounted in said base and having a center at its front end, said spindle being capable of a normally free axial and rotative movement in said base, a ring on the rear end of the spindle, an arm or sweep passing transversely through the spindle and adapted to be engaged by the ring, and a nut abutting the ring and operating therethrough to lock the arm to the spindle at various adjustments, the construction and arrangement being such that the rigid base, positioned against the normal surface of the body, serves to maintain the axis of rotation of the spindle and arm parallel to the cylinder-axis.

In testimony whereof I have signed my name to this specification, in the presence of two subscribing witnesses, this 8th day of December, A. D. 1897.

CHAS. V. BOGART.

Witnesses:
   J. F. WETHERBEE,
   A. M. PIKE.